(12) United States Patent
Hsia

(10) Patent No.: US 10,314,123 B1
(45) Date of Patent: Jun. 4, 2019

(54) SOLID-STATE LIGHTING WITH MULTIPLE CONTROL VOLTAGES

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/269,510

(22) Filed: Feb. 6, 2019

Related U.S. Application Data

(63) Continuation-in-part of application No. 16/247,456, filed on Jan. 14, 2019, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of
(Continued)

(51) Int. Cl.

| | |
|---|---|
| H02M 1/00 | (2006.01) |
| H02M 1/08 | (2006.01) |
| H02M 1/42 | (2007.01) |
| H02M 1/44 | (2007.01) |
| H02M 7/06 | (2006.01) |
| H05B 33/08 | (2006.01) |
| H05B 37/02 | (2006.01) |

(52) U.S. Cl.
CPC ......... *H05B 33/0815* (2013.01); *H02M 1/08* (2013.01); *H02M 1/44* (2013.01); *H05B 33/0851* (2013.01); *H05B 37/0272* (2013.01); *H02M 1/4208* (2013.01); *H02M 7/06* (2013.01); *H02M 2001/0009* (2013.01)

(58) Field of Classification Search
None
See application file for complete search history.

(56) References Cited

U.S. PATENT DOCUMENTS

| | | | |
|---|---|---|---|
| 6,867,557 B2 * | 3/2005 | Ito ................. | H05B 33/0815 315/307 |
| 2014/0035474 A1 * | 2/2014 | Kuo ................ | H05B 33/0848 315/200 R |

(Continued)

*Primary Examiner* — Minh D A
*Assistant Examiner* — James H Cho
(74) *Attorney, Agent, or Firm* — Han IP PLLC; Andy M. Han

(57) ABSTRACT

An LED luminaire comprises a power switching driver, an electric current controller, LED array(s) powered by the electric current controller, and a detection and control circuit. The detection and control circuit comprises comparator(s), a voltage regulator circuit, and a pair of low-voltage input/output ports receiving an external voltage. The detection and control circuit is configured to extract a controllable feedback signal voltage from an output voltage coupled from the power switching driver, an output current driving the LED array(s), and the external voltage and to couple to the electric current controller to change the output current driving the LED array(s). The external voltage comprises a voltage sent from a wireless luminaire controller, which comprises a wireless module and a meter and control unit. The wireless luminaire controller is configured to receive commands from the wireless module, to control the LED luminaire, and to measure in response to the commands.

23 Claims, 3 Drawing Sheets

Related U.S. Application Data application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2016/0262226 A1* | 9/2016 | Kangyo | H05B 33/0815 |
| 2019/0058343 A1* | 2/2019 | Liu | H02J 7/0052 |

* cited by examiner

SOLID-STATE LIGHTING WITH MULTIPLE CONTROL VOLTAGES

CROSS-REFERENCE TO RELATED APPLICATIONS

The present disclosure is part of a continuation-in-part (CIP) application of U.S. patent application Ser. No. 16/247,456, filed 14 Jan. 2019, which is part of CIP application of U.S. patent application Ser. No. 16/208,510, filed 3 Dec. 2018, which is part of CIP application of U.S. patent application Ser. No. 16/154,707, filed 8 Oct. 2018, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire with multiple control voltages to change a light level of the LED luminaire and to measure some operating parameters in response to commands received from a wireless luminaire controller.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate-current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, AC mains-operable LED lamps do not require a ballast to operate. Before use of the AC mains-operable LED lamps, the ballast in a fixture must be removed or bypassed. Removing or bypassing the ballast does not require an electrician and can be replaced by end users. Each of AC mains-operable LED lamps is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies. Moreover, the AC mains-operable LED lamps consume less power than ballast compatible LED lamps do because extra power consumed by the ballast is saved.

To further save lighting energy cost, the lighting industry proposed to use daylight harvesting years ago. In daylight harvesting, the ambient light such as natural daylight and an artificial light present in a space is utilized to reduce overhead lighting. When a sufficient ambient light level is present or when the space is unoccupied, a control mechanism in a daylight harvesting system dims or switches off the artificial light in the system. The daylight harvesting system is typically designed to maintain a recommended light level, which varies depending on activity needs in the space. For instance, the commonly recommended light level for normal office work, study library, personal computer work, groceries, show rooms, and laboratory is 500 lux on the desktop, whereas in warehouses and homes, the recommended light level is 250 lux.

The daylight harvesting system uses a photo-sensor to detect a prevailing light level in an open-loop or a closed-loop manner. The photo-sensor is used to adjust light level from electric lighting based on the available daylight in the space. In an open-loop system, the photo-sensor is used to detect the amount of available daylight only and can be positioned on the building's exterior wall or roof, or inside the building facing the window or skylight. In a closed-loop system, the photo-sensor is used to measure total photometric amount of light, from both daylight and electric lighting in the space. For instance, in an office, a closed-loop photo-sensor can be positioned on the ceiling facing the desktops in order to detect the amount of light on the work surface. In both the open- and closed-loop configurations, the signal from the photo-sensor must be calibrated to accurately show the effect of exterior daylight variations on the light level for activities in the space.

Studies have shown that by using daylight harvesting technologies, owners can have an average annual energy savings of 24%. Even with such a potential energy saving, some of daylight harvesting systems still cannot be widely accepted. In fact, impressive energy savings estimates may not be realized in practice due to a poor system design, a time-consuming calibration, or a complicated commissioning. High costs and imperfect performance of the technologies also inhibit the adoption of daylight harvesting technologies.

The AC mains-operable LED luminaires can easily be used with a wireless lighting control system, taking advantages of no rewiring needed for wireless control. No wiring or rewiring can save dramatic installation cost, and such a lighting control system is free of the wiring errors in contrast to an all wired system that is highly susceptible to such errors. With the acceleration of LED luminaire deployment in the lighting industry, the needs of energy saving, utilization efficiency of lighting energy, and intelligent control of lighting have become very urgent. Traditional luminaire controls have drawbacks such as no scheduling possible for manual switch control, susceptibility of the interference by the strong magnetic field from a power line for power carrier control, and failing to meet the requirements of centralized monitoring, recording, and energy management. On the other hand, the lighting industry needs control systems that can program different lighting schedules across multiple zones based on shifts or the type of work occurring throughout the day. Moreover, users can dim individual lights or adjust light levels for any area in buildings and streets or scheduling for more energy savings. It is, therefore, a motive to design such an LED luminaire incorporating a cost-effective remote wireless control that is simple to implement without commissioning in the field.

SUMMARY

An LED luminaire comprises one or more LED arrays, a full-wave rectifier configured to convert a line voltage from the AC mains into a first direct-current (DC) voltage, an input filter configured to suppress electromagnetic interference (EMI) noise, a power switching driver, an electric current controller, and a detection and control circuit. The power switching driver comprises a power factor correction (PFC) and control circuit and a transformer having a primary side relative to a first ground reference and a secondary side relative to a second ground reference. The power switching driver is coupled to the full-wave rectifier via the input filter and configured to convert the first DC voltage into a second DC voltage. The power switching driver further comprises a first rectifier and a first at least one output capacitor. The first rectifier and the first at least one output capacitor are configured to build up the second DC voltage to operate the electric current controller to drive the one or more LED arrays. The electric current controller comprises at least one current sensing resistor and an enable input. The electric current controller is configured to convert the second DC voltage into a third DC voltage with an output current driving the one or more LED arrays. The at least one current sensing resistor is coupled in series with the one or more LED arrays and configured to convert the output current driving the one or more LED arrays into an error control voltage sent to the electric current controller to control a current flowing into and out of the one or more LED arrays.

The electric current controller further comprises a diode, a second electronic switch, a second at least one output capacitor, and an inductor. The diode, the second electronic switch, the second at least one output capacitor, and the inductor are configured to build up the third DC voltage and to provide the output current driving the one or more LED arrays in response to a controllable feedback signal voltage. The second electronic switch comprises a transistor, a metal-oxide-semiconductor field-effect transistor (MOSFET), or a combination thereof.

The detection and control circuit comprises a voltage regulator, a voltage comparator circuit, and a pair of low-voltage input/output ports receiving an external voltage $V_{BB'}$. The detection and control circuit is configured to extract the controllable feedback signal voltage from the external voltage $V_{BB'}$ and to couple the controllable feedback signal voltage to the electric current controller to change the output current driving the one or more LED arrays. The voltage regulator comprises at least one transistor and a voltage divider circuit coupled to the at least one transistor. The at least one transistor and the voltage divider circuit are configured to regulate the second DC voltage into a fourth DC voltage to operate the voltage comparator circuit. The voltage regulator circuit further comprises a Zener diode configured to control the at least one transistor to provide the fourth DC voltage to operate the voltage comparator circuit.

The voltage comparator circuit comprises a first comparator circuit configured to compare a DC voltage coupled from the fourth DC voltage with the external voltage, partially controlling the controllable feedback signal voltage. The first comparator circuit comprises a first comparator, a resistor, and a first electronic switch coupled to the first comparator. The first comparator, the resistor, and the first electronic switch are configured to pull down the controllable feedback signal voltage when the external voltage $V_{BB'}$ is less than the fourth DC voltage. Specifically, when the external voltage $V_{BB'}$ is a zero voltage, the first comparator outputs a relatively high voltage, immediately controlling the first electronic switch to pull down the controllable feedback signal voltage to a minimum. The first comparator circuit further comprises a voltage divider circuit configured to provide a second voltage reference to appear at the pair of low-voltage input/output ports when the pair of low-voltage input/output ports are floating. The first comparator circuit further comprises at least one integrator circuit configured to average out a pulse-width modulation (PWM) signal inputted from the external voltage $V_{BB'}$.

The voltage comparator circuit further comprises a second comparator circuit configured to build up a first voltage reference. The voltage comparator circuit further comprises a third comparator circuit comprising a third comparator. The third comparator circuit is configured to receive an integrated signal from both the external voltage $V_{BB'}$ and the fourth DC voltage, to compare the integrated signal with the first voltage reference, and to partially control the controllable feedback signal voltage. The electric current controller further comprises a PWM generator and a fourth comparator. The fourth comparator is configured to receive the controllable feedback signal voltage via the enable input and to enable the PWM generator to tune the output current driving the one or more LED arrays in response to the controllable feedback signal voltage.

The external voltage $V_{BB'}$ comprises control signals received from a wireless luminaire controller. The wireless luminaire controller comprises a wireless module configured to communicate with a gateway by receiving commands of switching, 0-to-10 volts dimming, and metering from the gateway and responding luminaire statuses and metering results to the gateway. The wireless luminaire controller further comprises a meter and control unit receiving commands from the wireless module. The meter and control unit is configured to control the LED luminaire and to measure in response to the commands. The meter and control unit comprises one or more meters configured to measure an AC current, an AC voltage, a temperature, an active power, or a reactive power. The meter and control unit further comprises a power and low-voltage controller configured to control an AC power to couple to the power switching driver and to control the external voltage $V_{BB'}$. The wireless luminaire controller further comprises a pair of controlled AC output coupled to the power switching driver. The pair of controlled AC output is configured to turn on or shut off the AC power to the power switching driver. The meter and control unit further comprises a photo control configured to overwrite commands of the switching and the 0-to-10 volts dimming and to turn on the AC power to the power switching driver when ambient light level is below a predetermined value. The external voltage comprises a nominal DC voltage in a range from 0 to 10 volts.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
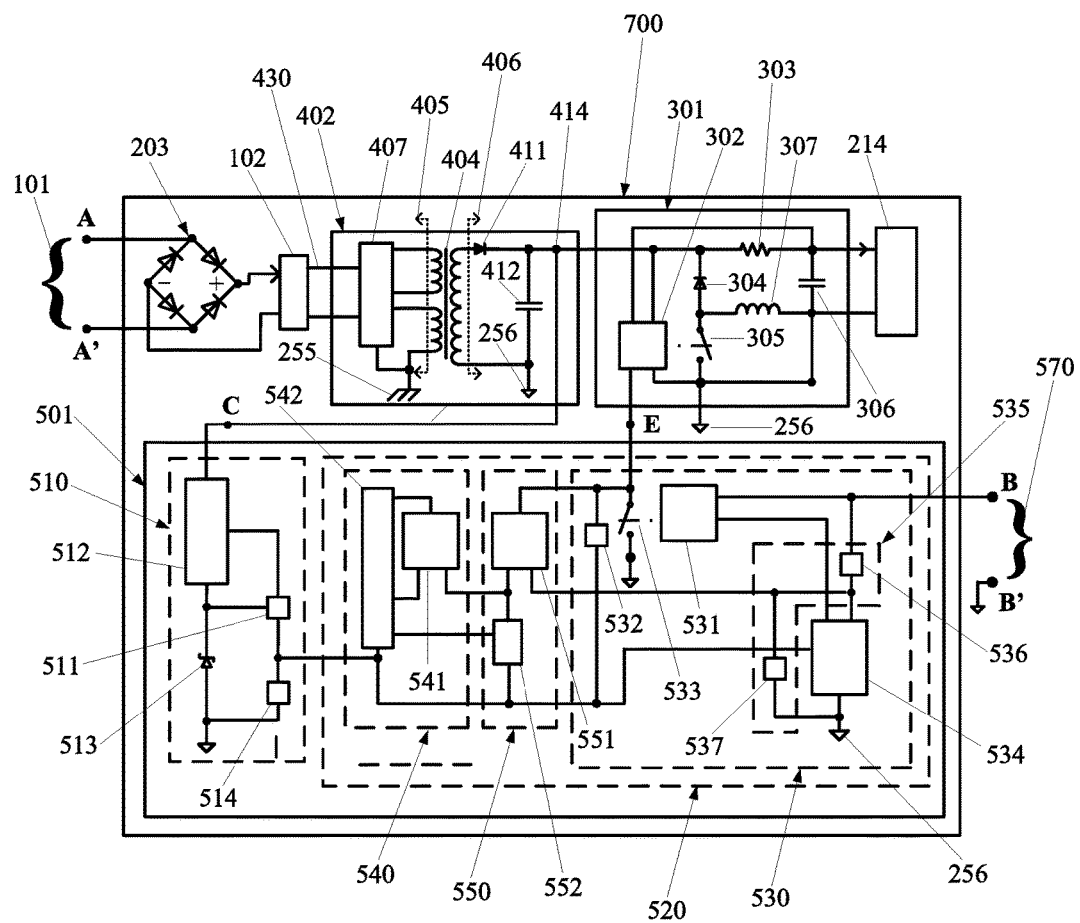
FIG. 1 is a block diagram of an LED luminaire with multiple control voltages according to the present disclosure.

FIG. 1 is a block diagram of an LED luminaire 700 with multiple control voltages according to the present disclosure. The LED luminaire 700 comprises one or more LED arrays 214, a full-wave rectifier 203 connected to a pair of AC power input ports 101 receiving a line voltage from the AC mains, an input filter 102, a power switching driver 402, an electric current controller 301, and a detection and control circuit 501. The pair of AC power input ports 101 are also denoted as AA'. The input filter 102 is configured to suppress EMI noise. The full-wave rectifier 203 is configured to convert the line voltage from the AC mains into a first DC voltage. The power switching driver 402 comprises a power factor correction (PFC) and control circuit 407 and a transformer 404 having a primary side 405 relative to a first ground reference 255 and a secondary side 406 relative to a second ground reference 256. The power switching driver 402 is coupled to the full-wave rectifier 203 via the input filter 102 through a power input 430. The power switching driver 402 is configured to convert the first DC voltage into a second DC voltage. The power switching driver 402 further comprises a first rectifier 411 and at least one output capacitor 412. The first rectifier 411 and the at least one output capacitor 412 are configured to build up the second DC voltage at an output port 414 to power up the electric current controller 301 and the detection and control circuit 501.

The electric current controller 301 comprises a driving device 302, at least one current sensing resistor 303, and an enable input E receiving a controllable feedback signal voltage. The electric current controller 301 receives the second DC voltage from the output port 414 to power up the electric current controller 301 and is configured to convert the second DC voltage into a third DC voltage with an output current driving the one or more LED arrays 214. The at least one current sensing resistor 303 is coupled in series with the one or more LED arrays 214 and configured to convert the output current driving the one or more LED arrays 214 into an error control voltage sent to the driving device 302 to control a current flowing into and out of the one or more LED arrays 214. The electric current controller 301 further comprises a diode 304, a second electronic switch 305, a second at least one output capacitor 306, and an inductor 307. The diode 304, the second electronic switch 305, the second at least one output capacitor 306, and the inductor 307 are configured to build up the third DC voltage and to provide the output current driving the one or more LED arrays 214 in response to the controllable feedback signal voltage. The second electronic switch 305 comprises a transistor, a metal-oxide-semiconductor field-effect transistor (MOSFET), or a combination thereof.

In FIG. 1, the detection and control circuit 501 comprises the second ground reference 256, a voltage regulator 510, a voltage comparator circuit 520, and a pair of low-voltage input/output ports 570 (also denoted as BB') receiving an external voltage $V_{BB'}$. The second ground reference 256 is the same as the ground reference for the electric current controller 301 and for the secondary side 406 of the transformer 404. Thus, multiple control signal voltages can be sent single-ended (like "C" and "E" in FIG. 1) among the power switching driver 402, the electric current controller 301, and the detection and control circuit 501 because they share the same ground reference 256. The detection and control circuit 501 is configured to extract the controllable feedback signal voltage from the external voltage $V_{BB'}$ and to couple the controllable feedback signal voltage to the electric current controller 301 to change the output current driving the one or more LED arrays 214. The voltage regulator 510 receives the second DC voltage from the output port 414 of the power switching driver 402, also denoted as C in the detection and control circuit 501. The voltage regulator 510 comprises at least one transistor 511 and a first voltage divider circuit 512 coupled to the at least one transistor 511. The at least one transistor 511 and the first voltage divider circuit 512 are configured to regulate the second DC voltage into a fourth DC voltage to operate the voltage comparator circuit 520. The voltage regulator circuit 510 further comprises a Zener diode 513 and a capacitor 514. The Zener diode 513 and the capacitor 514 are configured to control the at least one transistor 511 to provide the fourth DC voltage to operate the voltage comparator circuit 520.

In FIG. 1, the voltage comparator circuit 520 comprises a first comparator circuit 530 configured to compare a fifth DC voltage coupled from the fourth DC voltage with the external voltage $V_{BB'}$, partially controlling the controllable feedback signal voltage. The first comparator circuit 530 comprises a first comparator 531, a resistor 532, a first electronic switch 533 coupled to the first comparator 531, and a second voltage divider circuit 534 configured to set up the fifth DC voltage. The first comparator 531, the resistor 532, and the first electronic switch 533 are configured to pull down the controllable feedback signal voltage when the external voltage $V_{BB'}$ is less than the fourth DC voltage. Specifically, when the external voltage $V_{BB'}$ is a zero voltage, the first comparator 531 outputs a relatively high-level voltage equivalent to a voltage operating the first comparator, immediately controlling the first electronic switch to pull down the controllable feedback signal voltage to the second ground reference. The second voltage divider circuit 534 is further configured to provide a second voltage reference to appear at the pair of low-voltage input/output ports 570 when the pair of low-voltage input/output ports 570 are floating. The first comparator circuit 530 further comprises at least one integrator circuit 535 comprising a resistor 536 and a capacitor 537 configured to average out a pulse-width modulation (PWM) signal inputted from the external voltage $V_{BB'}$.

In FIG. 1, the voltage comparator circuit 520 further comprises a second comparator circuit 540. The second comparator circuit 540 comprises a second comparator 541 and a third voltage divider circuit 542. The second comparator circuit 540 is configured to build up a first voltage reference. The voltage comparator circuit 520 further comprises a third comparator circuit 550 comprising a third comparator 551 and a fourth voltage divider circuit 552. The third comparator circuit 550 is configured to receive an integrated signal from both the external voltage $V_{BB'}$ and the fourth DC voltage, to compare the integrated signal with the first voltage reference, and to partially control the controllable feedback signal voltage. As can be seen in FIG. 1, the third comparator 551 is connected to the first electronic switch 533. In other words, both the first comparator circuit 530 and the third comparator circuit 550 control the controllable feedback signal voltage.

Figure 2:
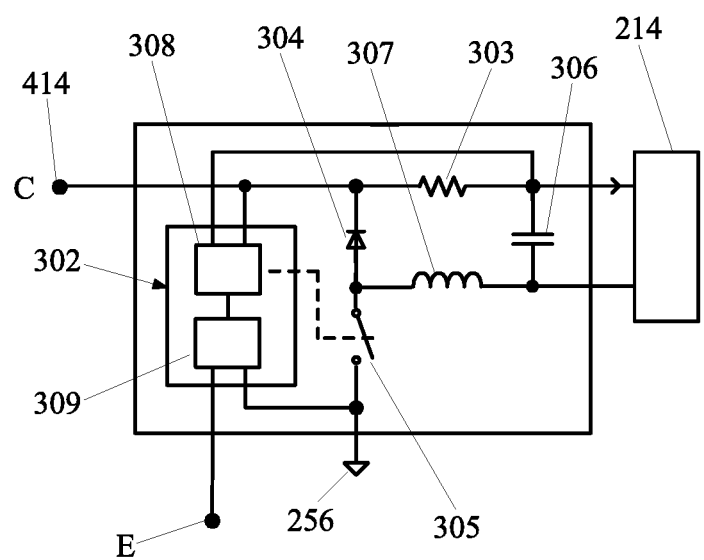
FIG. 2 is an embodiment of an electric current controller according to the present disclosure.

FIG. 2 is an embodiment of an electric current controller according to the present disclosure. In FIG. 2, the electric current controller 301 comprises a driving device 302, at least one current sensing resistor 303, an enable input E, and the second ground reference 256, as depicted in FIG. 1. The second ground reference 256 is the same as the ground reference for the secondary side 406 of the transformer 404 in FIG. 1. The electric current controller 301 receives the second DC voltage from the port 414 of the power switching driver 402 and is configured to convert the second DC voltage into a third DC voltage with an output current driving the one or more LED arrays 214. The at least one current sensing resistor 303 is coupled in series with the one or more LED arrays 214 and configured to convert the output current driving the one or more LED arrays 214 into the error control voltage sent to the driving device 302 to control a current flowing into and out of the one or more LED arrays 214. The electric current controller 301 further comprises a diode 304, a second electronic switch 305, a second at least one output capacitor 306, and an inductor 307, wherein the diode 304, the second electronic switch 305, the second at least one output capacitor 306, and the inductor 307 are configured to build up the third DC voltage and to provide the output current driving the one or more LED arrays 214 in response to the controllable feedback signal voltage. The second electronic switch 305 comprises a transistor, a metal-oxide-semiconductor field-effect transistor (MOSFET), or a combination thereof. In FIG. 2, the driving device 302 further comprises a PWM generator 308 and a fourth comparator 309, and wherein the fourth comparator 309 is configured to receive the controllable feedback signal voltage via the enable input E and to enable the PWM generator 308 to tune the output current driving the one or more LED arrays 214 in response to the controllable feedback signal voltage.

Figure 3:
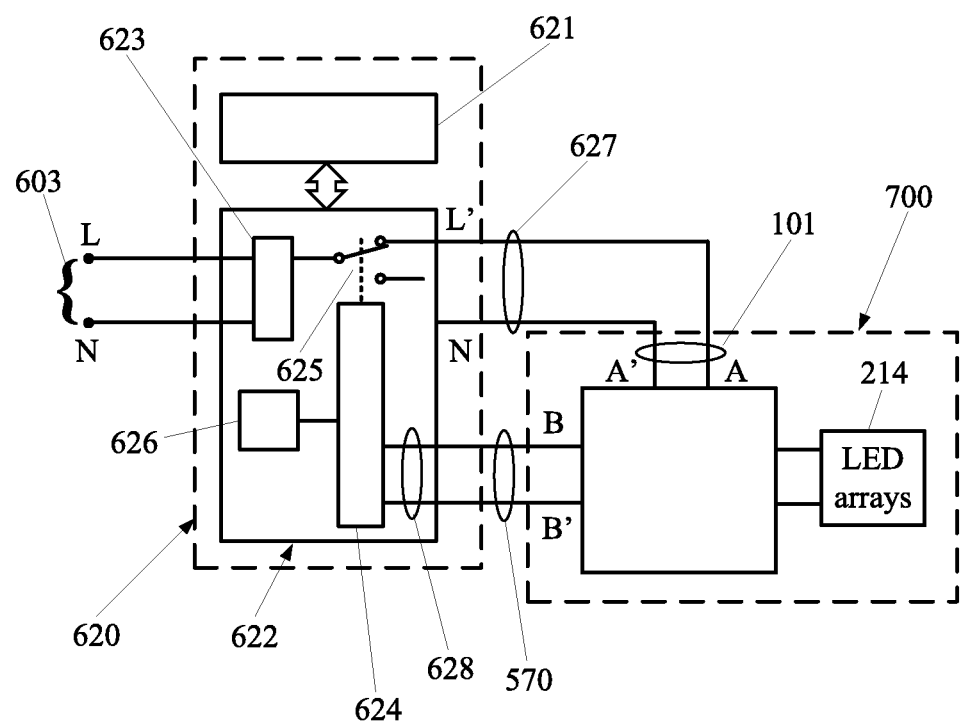
FIG. 3 is a block diagram of the LED luminaire integrated with a wireless luminaire controller according to the present disclosure.

FIG. 3 is a block diagram of the LED luminaire integrated with a wireless luminaire controller according to the present disclosure. In FIG. 3, the LED luminaire 700 comprises the pair of AC power input ports 101, also denoted as AA', and the pair of low-voltage input/output ports 570, also denoted as ports BB'. The pair of AC power input ports 101 and the pair of low-voltage input/output ports 570 are connected to a wireless luminaire controller 620. The wireless luminaire controller 620 comprises a wireless module 621 configured to communicate with a gateway (not shown) by receiving commands of switching, 0-to-10 volts dimming, and metering from the gateway and responding luminaire statuses and metering results to the gateway. The wireless luminaire controller 620 further comprises a meter and control unit 622 receiving commands from the wireless module 621. The meter and control unit 622 is configured to control the LED luminaire 700 via the pair of AC power input ports 101 and the pair of low-voltage input/output ports 570 and to measure in response to the commands. The meter and control unit 622 comprises one or more meters 623 configured to measure an AC current, an AC voltage, a temperature, an active power, or a reactive power.

In FIG. 3, the meter and control unit 622 further comprises a power and low-voltage controller 624 configured to control an AC power to deliver to the power switching driver 402 (in FIG. 1) of the LED luminaire 700 via the pair of AC power input ports 101 and to control the external voltage $V_{BB'}$ via the pair of low-voltage input/output ports 570. The meter and control unit 622 further comprises a relay 625 controlled by the power and low-voltage controller 624 and a photo control 626 configured to overwrite commands of the switching and the 0-to-10 volts dimming and to turn on the AC power to couple to the power switching driver 402 of the LED luminaire 700 when ambient light level is below a predetermined value. In other words, when ambient light level is below a predetermined value, say 1.5 foot-candle, the photo control 626 instantly controls the power and low-voltage controller 624 to control the relay 625 to immediately turn on the AC power to the LED luminaire 700. In this case, the wireless luminaire controller 620 may further comprise a pair of controlled AC output 627 coupled to the power switching driver 402 (in FIG. 1) of the LED luminaire 700.

In FIG. 3, the wireless luminaire controller 620 further comprises a pair of AC input ports 603 receiving the AC power from the AC mains and a pair of low-voltage output ports 628. The pair of AC input ports 603 are also denoted as LN whereas the pair of AC output ports 627 are also denoted as L'N. The pair of low-voltage output ports 628 is connected to the pair of low-voltage input/output ports 570 in the LED luminaire 700. The pair of AC output ports 627 connected to the relay 625 is connected to the pair of AC power input ports 101 in the LED luminaire 700. When the AC power LN is available, the relay 625 is enabled by the power and low-voltage controller 624 to couple the AC power LN to the pair of AC output ports 627 and to deliver a controlled power to the pair of AC power input ports 101 denoted as AA' in the LED luminaire 700 providing the controlled power to operate the LED luminaire 700.

In FIG. 3, when the AC power LN 603 is available but the command received from the wireless module 621 demands turning off the LED luminaire 700, the power and low-voltage controller 624 controls the relay 625 to disconnect the AC power LN 603 to the pair of AC output ports 627, thus completely shutting off the LED luminaire 700 for conserving energy. When the AC power LN 603 is available and the photo control 626 detects ambient light level is lower than a predetermined value, the power and low-voltage controller 624 controls the relay 625 to couple the AC power LN 603 to the pair of AC output ports 627 and to deliver the controlled power L'N to the pair of AC power input ports 101 in the LED luminaire 700 providing the controlled power to operate the LED luminaire 700. Therefore, the photo control 626 overwrites the command to turn on the LED luminaire 700 for security reasons. On the other hand, when the AC power LN 603 is available and the photo control 626 detects ambient light level is higher than another predetermined value, say 2.25 foot-candle, the power and low-voltage controller 624 controls the relay 625 to disconnect the AC power LN 603 to the pair of AC output ports 627 and to disconnect the controlled power L'N to the pair of AC power input ports 101, shutting off the LED luminaire 700. The photo control 626 overwrites the command to shut off the LED luminaire 700 for energy saving. That is to say that the pair of controlled AC output 627 is configured to connect to the pair of AC power input ports 101 and to turn on or shut off an AC power to the power switching driver 402. The external voltage $V_{BB'}$ at the pair of low-voltage input/output ports 570 comprises a nominal DC voltage in a range from 0 to 10 volts.

Whereas preferred embodiments of the present disclosure have been shown and described, it will be realized that alterations, modifications, and improvements may be made thereto without departing from the scope of the following claims. Another kind of schemes with multiple control voltages adopted in an LED luminaire using various kinds of combinations to accomplish the same or different objectives could be easily adapted for use from the present disclosure.

Accordingly, the foregoing descriptions and attached drawings are by way of example only, and are not intended to be limiting.

What is claimed is:

1. A light-emitting diode (LED) luminaire, comprising:
one or more LED arrays;
a full-wave rectifier configured to convert a line voltage from alternate-current (AC) mains into a first direct-current (DC) voltage;
an input filter configured to suppress an electromagnetic interference (EMI) noise;
a power switching driver comprising a power factor correction (PFC) and control circuit and a transformer having a primary side relative to a first ground reference and a secondary side relative to a second ground reference, the power switching driver coupled to the full-wave rectifier via the input filter and configured to convert the first DC voltage into a second DC voltage;
an electric current controller comprising at least one current sensing resistor and an enable input, the electric current controller configured to convert the second DC voltage into a third DC voltage with an output current driving the one or more LED arrays; and
a detection and control circuit comprising a voltage regulator, a voltage comparator circuit, and a pair of low-voltage input/output ports receiving an external voltage, the detection and control circuit configured to extract a controllable feedback signal voltage from the external voltage and to couple the controllable feedback signal voltage to the electric current controller to change the output current driving the one or more LED arrays;
wherein:
the voltage regulator comprises at least one transistor and a first voltage divider circuit coupled to the at least one transistor, the at least one transistor and the first voltage divider circuit configured to regulate the second DC voltage into a fourth DC voltage to operate the voltage comparator circuit;
the voltage comparator circuit comprises a first comparator circuit comprising a second voltage divider circuit, the first comparator circuit configured to compare a fifth DC voltage developed from the fourth DC voltage by the second voltage divider circuit with the external voltage, partially controlling the controllable feedback signal voltage; and
the enable input is configured to receive the controllable feedback signal voltage for the electric current controller to provide the output current driving the one or more LED arrays in response to the controllable feedback signal voltage.

2. The LED luminaire of claim 1, wherein the first comparator circuit further comprises a first comparator, a resistor, and a first electronic switch coupled to the first comparator, wherein the first comparator, the resistor, and the first electronic switch are configured to pull down the controllable feedback signal voltage when the external voltage is less than the fourth DC voltage.

3. The LED luminaire of claim 2, wherein, when the external voltage is a zero voltage, the first comparator outputs a relatively high-level voltage equivalent to a voltage operating the first comparator, immediately controlling the first electronic switch to pull down the controllable feedback signal voltage to the second ground reference.

4. The LED luminaire of claim 2, wherein the first electronic switch comprises a silicon-controlled rectifier (SCR), a transistor, a metal-oxide-semiconductor field-effect transistor (MOSFET), or a combination thereof.

5. The LED luminaire of claim 1, wherein the voltage comparator circuit further comprises a second comparator circuit comprising a second comparator and a third voltage divider circuit, the second comparator circuit configured to build up a first voltage reference.

6. The LED luminaire of claim 5, wherein the voltage comparator circuit further comprises a third comparator circuit comprising a third comparator and a fourth voltage divider circuit, the third comparator circuit configured to receive an integrated signal, from both the external voltage and the fourth DC voltage, to compare the integrated signal with the first voltage reference and to partially control the controllable feedback signal voltage.

7. The LED luminaire of claim 1, wherein the first comparator circuit further comprises at least one integrator circuit configured to average out a pulse-width modulation (PWM) signal inputted from the external voltage.

8. The LED luminaire of claim 1, wherein the voltage regulator circuit further comprises a Zener diode configured to control the at least one transistor to provide the fourth DC voltage to operate the voltage comparator circuit.

9. The LED luminaire of claim 1, wherein the electric current controller further comprises a pulse-width modulation (PWM) generator and a fourth comparator, and wherein the fourth comparator is configured to receive the controllable feedback signal voltage via the enable input and to enable the PWM generator to tune the output current driving the one or more LED arrays in response to the controllable feedback signal voltage.

10. The LED luminaire of claim 1, wherein the power switching driver further comprises a first rectifier and a first at least one output capacitor, and wherein the first rectifier and the first at least one output capacitor are configured to build up the second DC voltage to operate the electric current controller to drive the one or more LED arrays.

11. The LED luminaire of claim 1, wherein the electric current controller further comprises a diode, a second electronic switch, a second at least one output capacitor, and an inductor, and wherein the diode, the second electronic switch, the second at least one output capacitor, and the inductor are configured to build up the third DC voltage and to provide the output current driving the one or more LED arrays in response to the controllable feedback signal voltage.

12. The LED luminaire of claim 11, wherein the second electronic switch comprises a transistor, a metal-oxide-semiconductor field-effect transistor (MOSFET), or a combination thereof.

13. The LED luminaire of claim 1, wherein the at least one current sensing resistor is coupled in series with the one or more LED arrays and is configured to convert the output current driving the one or more LED arrays into an error control voltage sent to the electric current controller to control a current flowing into and out of the one or more LED arrays.

14. The LED luminaire of claim 1, wherein the second voltage divider circuit is further configured to provide a second voltage reference to appear at the pair of low-voltage input/output ports when the pair of low-voltage input/output ports are floating.

15. The LED luminaire of claim 1, wherein the external voltage comprises controllable signal voltages received from a wireless luminaire controller.

16. The LED luminaire of claim 15, further comprising the wireless luminaire controller, wherein the wireless luminaire controller comprises a wireless module configured to receive commands of switching, 0-to-10 volts dimming, and metering and to respond luminaire statuses and metering results.

17. The LED luminaire of claim 16, wherein the wireless luminaire controller further comprises a meter and control unit receiving the commands from the wireless module, the meter and control unit configured to control the LED luminaire in response to the commands.

18. The LED luminaire of claim 17, wherein the meter and control unit comprises one or more meters configured to measure an AC current, an AC voltage, a temperature, or an active power.

19. The LED luminaire of claim 17, wherein the meter and control unit comprises a power and low-voltage controller configured to control an AC power to couple to the power switching driver and to control the external voltage.

20. The LED luminaire of claim 19, wherein the meter and control unit further comprises a photo control configured to overwrite commands of the switching and the 0-to-10 volts dimming and to turn on the AC power to couple to the power switching driver when an ambient light level is below a first predetermined value.

21. The LED luminaire of claim 20, wherein the photo control is further configured to overwrite commands of the switching and the 0-to-10 volts dimming and to disconnect the AC power to couple to the power switching driver when the ambient light level is above a second predetermined value.

22. The LED luminaire of claim 15, further comprising the wireless luminaire controller, wherein the wireless luminaire controller comprises a pair of controlled AC outputs coupled to the power switching driver, the pair of controlled AC outputs configured to turn on or shut off an AC power to the power switching driver.

23. The LED luminaire of claim 1, wherein the external voltage comprises a nominal DC voltage in a range from 0 to 10 volts.

* * * * *